United States Patent [19]
Kawakami et al.

[11] Patent Number: 5,563,755
[45] Date of Patent: Oct. 8, 1996

[54] REDUCED FRICTION TAPE CONTACT SURFACE FOR TAPE RECORDING AND REPRODUCING APPARATUS

[75] Inventors: Kikuji Kawakami; Hiroyuki Osaki, both of Miyagi, Japan

[73] Assignee: Sony Corporation, Tokyo, Japan

[21] Appl. No.: 205,802

[22] Filed: Mar. 4, 1994

[30] Foreign Application Priority Data

Mar. 12, 1993 [JP] Japan .................................. 5-052129

[51] Int. Cl.⁶ .................................................. C11B 15/60
[52] U.S. Cl. .................. 360/130.21; 360/84; 360/130.24
[58] Field of Search .......................... 360/130.21, 84–85, 360/103.2, 130.24

[56] References Cited

U.S. PATENT DOCUMENTS 3,898,693  8/1975  Chang ....................... 360/84

OTHER PUBLICATIONS

Derwent Publications Ltd., London, GB, Japanese Abstract JP2214020, 27 Aug. 1990.
Derwent Publications Ltd., London, GB, Japanese Abstract, JP62092114, 17 Oct. 1985.
Derwent Publications Ltd., London, GB, Japanese Abstract, JP2285508, 26 Apr. 1989.
Derwent Publications Ltd., London, GB, Japanese Abstract, JP62257615, 1 May 1986.
Derwent Publication Ltd., London, GB, Japanese Abstract, JP62052714, 24 Feb. 1993.
Patent Abstract of Japan, "Magnetic Recording Medium", vol. 12, No. 126, 26 Apr. 1988, JP62257615, 26 Nov. 10, 1987.
Patent Abstract of Japan, "Manufacture of Magnetic Recording Medium", vol. 8, No. 153, 17 Jul. 1984, JP59052431, Mar. 27, 1984.
Derwent Publication Ltd., London, GB, Japanese Abstract, JP61126602, 14 Jun. 1986.
Patent Abstract of Japan, "Sheet Raw Material for Floppy Disk Cartridge Storage Bagand Its Manufacture", vol. 9, No. 68, 28 Mar. 1985, JP59201276, Nov. 14, 1984.

*Primary Examiner*—A. J. Heinz
*Attorney, Agent, or Firm*—Hill, Steadman & Simpson

[57] ABSTRACT

An apparatus for recording and reproducing a tape-shaped recording medium, which is capable of minimizing the effect of adsorbed water present at the interface between the tape and a sliding member and hence enables the tape to travel stably without sticking to the sliding member even under conditions close to moisture condensational conditions. An aluminum alloy is employed as a material for a sliding member such as a fixed drum, stationary tape guides, etc. on which a video tape slides, and a large number of projections are formed on the surface of the sliding member. A material of high water repellency is formed on the surface of the sliding member for the purpose of minimizing the effect of contact portions formed by the video tape and the projections of the sliding member and the effect of bonded portions of adsorbed water produced around the contact portions (at the interface). More specifically, the surface of the sliding member is formed with an electrolessly plated nickel film containing polytetrafluoroethylene particles.

2 Claims, 4 Drawing Sheets

REDUCED FRICTION TAPE CONTACT SURFACE FOR TAPE RECORDING AND REPRODUCING APPARATUS

FIELD OF THE INVENTION

The present invention relates to an apparatus for recording and reproducing an information signal on and from a tape-shaped recording medium such as a video tape, an audio tape, etc. More particularly, the present invention relates to an arrangement of a sliding member provided in a tape-shaped recording medium recording and reproducing apparatus so that a tape-shaped recording medium slides in contact with the sliding member.

BACKGROUND OF THE INVENTION

A conventional apparatus for recording and reproducing an information signal on and from a tape-shaped recording medium such as a video tape, an audio tape, etc., for example, a video tape recorder, is arranged as shown in FIG. 8. That is, a cylindrical rotary drum, which is equipped with video heads, is installed at a predetermined angle of inclination to a chassis board so as to record an information signal along linear tracks on a video tape by helical scanning.

In general, a plurality of tape guides and a pair of slant guide posts are provided around the rotary drum and a fixed drum for the purpose of accurately guiding a video tape to the lead of the fixed drum.

Recording and reproduction of an information signal with respect to a video tape are effected by traveling of the video tape along the lead of the fixed drum which is caused by rotation of a take-up reel (and a supply reel) and the rotary drum.

During the traveling, the video tape slides in contact with the surfaces of the stationary tape guides and the lead surface of the fixed drum, so that the video tape is subjected to frictional force produced by the contact sliding. When the frictional force caused by the contact sliding increases, the video tape cannot smoothly travel. As a result, the video tape may cause jamming. In the worst case, the video tape may be damaged.

Therefore, the conventional practice is to employ an aluminum alloy as a material for a sliding member 1, such as the fixed drum, stationary tape guides, etc., on which a video tape T slides, as shown in FIG. 5. Further, a large number of projections 1a are formed on the surface of the sliding member 1 to provide a configuration that reduces the area of contact with the video tape T, thereby minimizing frictional force produced between the video tape T and a part (sliding member 1) on which the video tape T slides.

However, in the conventional studies on the friction of the sliding member 1, notice has been taken of only the damage given to the tape T and how the coefficient of friction varies according to the number of times of sliding performed by the tape T, and studies have heretofore been conducted only from the mechanical point of view, for example, from the viewpoint of machining accuracy, easy machinability and hardness. Such studies have been satisfactory for the surface properties and tension of conventional tapes. However, as the surface properties of tapes improve and the tape tension decreases as in the present state of art, the following problems arise:

It has become clear that as the surface properties of the tape T improve and the tension of the tape T decreases, adsorbed water H which is present at the interface between the tape T and the sliding member 1 has a large effect on the traveling of the tape T. More specifically, by observation of the relationship between the layer thickness of adsorbed water H on the one hand and the temperature and humidity on the other when water molecules are physically adsorbed on the tape surface, it has been found that the layer thickness of adsorbed water H increases as the temperature and humidity rise, as shown in FIG. 6.

In general, during traveling, the tape T contacts the tips of the projections 1a of the sliding member 1 to form contact portions a of two metallic materials, as shown in FIG. 5. Friction occurs when the contact portions a are sheared. According to the characteristics shown in FIG. 6, as the temperature and humidity rise, the layer thickness of adsorbed water H increases, and hence bonded portions b of adsorbed water are produced around the contact portions a of the metallic materials. Accordingly, sliding of the tape T under high-temperature and high-humidity conditions involves not only shearing of the contact portions a of the metallic materials but also shearing of the bonded portions b of adsorbed water H. This means that frictional force (coefficient of friction) rises.

Let us show one experimental example. In this experiment, two different kinds of video tape, shown in Table 1 below, were moved past a conventional sliding member 1 made of an aluminum alloy to measure how the coefficients Y of friction of the two video tapes with respect to the sliding member 1 vary with the change of the relative humidity (the ambient temperature: 40° C.).

TABLE 1

| | | Surface roughness | |
| --- | --- | --- | --- |
| | | Maximum roughness Rmax | Average roughness Ra |
| Medium | Tape A | 300 nm | 20 nm |
| | Tape B | 50 nm | 4 nm |

The results of the experiment are shown in FIG. 7. As will be understood from the experimental results, with regard to the coated tape, which has a relatively high surface roughness, the friction coefficient Y is approximately constant throughout the entire humidity range, whereas, regarding the evaporated tape, which has a relatively low surface roughness, the friction coefficient Y rapidly rises from the region of humidity 78% and it jumps up to 0.85 at a high humidity in the region of humidity 94%.

Accordingly, the prior art suffers from the problem that when the VTR is operated under high-temperature and high-humidity conditions, the coefficient of friction occurring between the video tape T and the sliding member 1 rapidly rises, and as a result, the video tape T sticks to the sliding member 1, making it impossible to ensure the favorable traveling of the tape T.

In view of the above-described problems of the prior art, it is an object of the present invention to provide an apparatus for recording and reproducing a tape-shaped recording medium, which is capable of minimizing the effect of adsorbed water present at the interface between the tape and a sliding member and hence enables the tape to travel stably without sticking to the sliding member even under conditions close to moisture condensational conditions.

SUMMARY OF THE INVENTION

The present invention provides an apparatus for recording and reproducing a tape-shaped recording medium, which has a sliding member provided so that the tape-shaped recording medium slides in contact with the sliding member, wherein the pure water contact angle of the surface of the sliding member is set at 97° or more.

In this case, the surface of the sliding member is formed, for example, from an electrolessly plated nickel film containing polytetrafluoroethylene particles.

Describing elementally, in a video tape recorder, for example, a video tape is guided to a fixed drum by a plurality of tape guides and a pair of slant guide posts, which are disposed around the fixed drum, and the video tape is caused to travel along the lead of the fixed drum by rotation of a take-up reel (and a supply reel) and a rotary drum equipped with rotary heads, thereby enabling an information signal to be recorded on and reproduced from the video tape.

During the traveling, the tape slides in contact with the tape guides, particularly the stationary tape guides, the pair of guide posts and the lead surface of the fixed drum. In the present invention, a sliding member on which the tape slides, such as the stationary tape guides, the pair of guide posts, the fixed drum, etc., is formed from a material of high water repellency so that the pure water contact angle of the surface of the sliding member is at least 97°. Accordingly, it is possible to minimize the effect of adsorbed water present at the interface between the tape and the sliding member. Thus, the tape can stably travel without sticking to the sliding member even under conditions close to moisture condensational conditions. Consequently, it is possible to minimize damage to the tape.

Thus, the present invention provides an apparatus for recording and reproducing a tape-shaped recording medium, which has a sliding member provided so that the tape-shaped recording medium slides in contact with the sliding member, wherein the pure water contact angle of the surface of the sliding member is set at 97° or more. Accordingly, it is possible to minimize the effect of adsorbed water present at the interface between the tape and the sliding member, so that the tape can stably travel without sticking to the sliding member even under conditions close to moisture condensational conditions.

DETAILED DESCRIPTION OF PREFERRED EMBODIMENTS

One embodiment in which the tape-shaped recording medium recording and reproducing apparatus of the present invention is applied to an 8-mm video tape recorder (hereinafter referred to as "the recording and reproducing apparatus according to the embodiment") will be described below with reference to FIGS. 1 to 4.

The recording and reproducing apparatus according to the embodiment has a cylindrical rotary drum installed at a predetermined angle of inclination to a chassis board so as to record an information signal along linear tracks on a video tape by helical scanning.

In general, an 8-mm video tape recorder has a plurality of tape guides and a pair of slant guide posts provided around the rotary drum and a fixed drum for the purpose of accurately guiding a video tape to the lead of the fixed drum.

Recording and reproduction of an information signal with respect to a video tape are effected by traveling of the video tape along the lead of the fixed drum which is caused by rotation of a take-up reel (and a supply reel) and the rotary drum.

Figure 1A:
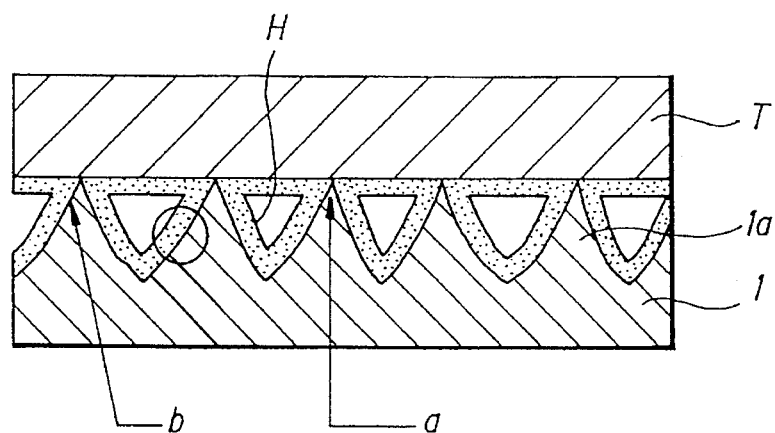
FIG. 1a is a sectional view showing the arrangement of a sliding member, together with a video tape, which is employed in an embodiment in which the tape-shaped recording medium recording and reproducing apparatus of the present invention is applied to an 8-mm video tape recorder, for example.

During the traveling, the video tape slides in contact with the surfaces of the stationary tape guides and the lead surface of the fixed drum, so that the video tape is subjected to frictional force produced by the contact sliding. Therefore, an aluminum alloy is employed as a material for a sliding member 1, such as the fixed drum, stationary tape guides, etc., on which a video tape T slides, as shown in FIG. 1a. Further, a large number of projections 1a are formed on the surface of the sliding member 1. The foregoing arrangement is the same as that of the conventional system.

Figure 1B:
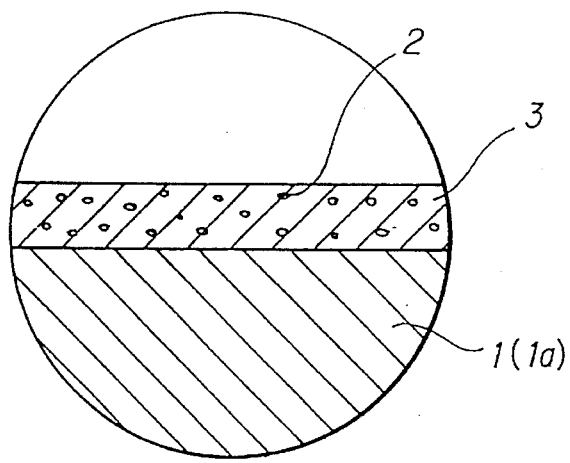
FIG. 1b is an enlarged view from FIG. 1.

In this embodiment, a material of high water repellency is formed on the surface of the sliding member 1, as shown in the enlarged view in FIG. 1b, for the purpose of minimizing the effect of contact portions a formed by the video tape T and the projections 1a of the sliding member 1 and the effect of bonded portions b of adsorbed water H produced around the contact portions a (at the interface). More specifically, the surface of the sliding member 1 is formed with an electrolessly plated nickel film 3 containing polytetrafluoroethylene particles 2. As a commercially available material, Nymflon (trade name) may be used.

Figure 2:
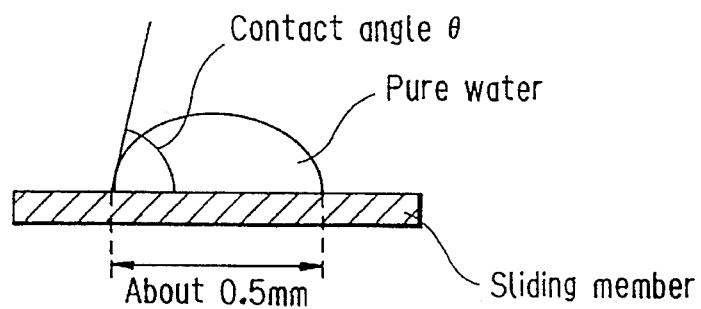
FIG. 2 illustrates a method of measuring a pure water contact angle of a sliding member.

Let us show one experimental example. First, the following three sliding members 1 were prepared: a sliding member 1 made of an aluminum alloy, the surface of which was formed with an electrolessly plated nickel film 3 containing polytetrafluoroethylene particles 2 (Example), and two sliding members 1 made of an aluminum alloy (Comparative Examples 1 and 2) having no plated film 3 formed thereon. Then, pure water contact angles θ of the sliding members of Example, Comparative Examples 1 and 2 were measured. The measurement of pure water contact angle was carried out as follows: As shown in FIG. 2, pure water was dropped on a sliding member in such an amount that the width of diffusion of the droplet on the sliding member was about 0.5 mm under ordinary temperature and ordinary humidity conditions, and the contact angle θ measured under these conditions was defined as pure water contact angle θ.

As a result of the measurement, the pure water contact angles of the sliding members were as follows: 117° in Example; 92° in Comparative Example 1; and 85° in Comparative Example 2. The results of the measurement are shown in Table 2 below:

TABLE 2

| Sliding member | Example | Comp. Example 1 | Comp. Example 2 |
|---|---|---|---|
| Contact angle (ordinary temp. & humidity) | 117° | 92° | 85° |

Usually, the pure water contact angle θ does not vary even when the temperature shifts several °C. or the humidity shifts about 20% under ordinary temperature and ordinary humidity conditions. Accordingly, it will be understood from the above results of the measurement that the sliding member of Example has high water repellency.

Further, in the experiment, how the coefficient Y of friction of a tape B (surface roughness: maximum roughness Rmax=50 nm; average roughness Ra=4 nm) with respect to a sliding member varied with the change of the relative humidity (the ambient temperature: 40° C.) was measured for each of the sliding members of Example, Comparative Examples 1 and 2. The results of the measurement are shown in FIG. 3.

Figure 3:
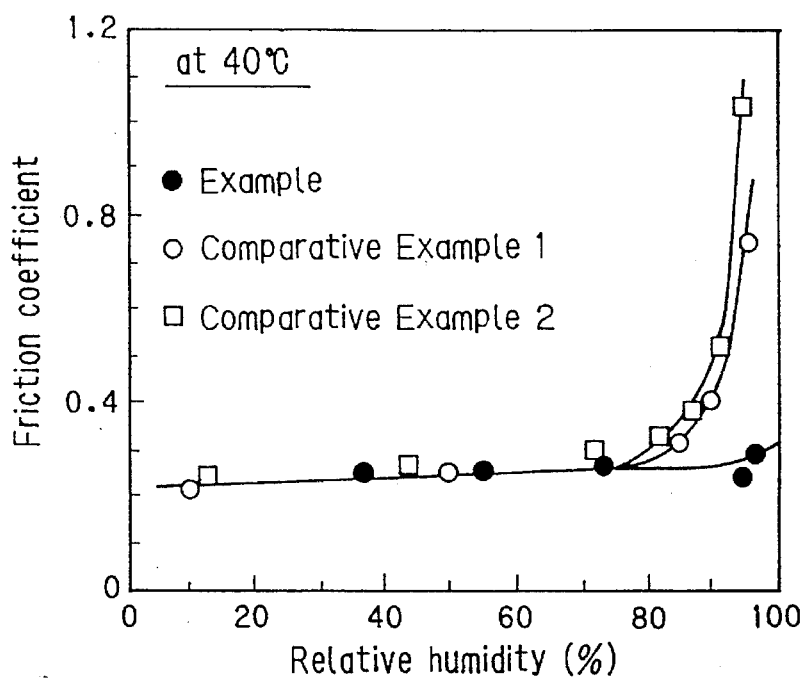
FIG. 3 is a characteristic chart showing the relationship between the coefficient of friction with respect to a tape (B) and the relative humidity in sliding members (Example, Comparative Examples 1 and 2) which are different in water repellency.

As will be understood from the results of the measurement shown in FIG. 3, with regard to the sliding member of Example, the friction coefficient Y assumes an approximately constant value throughout the entire humidity range, whereas, with regard to Comparative Examples 1 and 2, the friction coefficient Y rapidly rises from the region of humidity 75%. When the friction coefficient Y under high-humidity conditions of humidity 94% was sampled, results such as those shown in Table 3 below were obtained. That is, in Example, the friction coefficient was approximately constant throughout the entire humidity range, whereas, in Comparative Example 1, the friction coefficient jumped up to 0.74 at the humidity of 94%, and in Comparative Example 2, it jumped up to 1.02 at the same humidity level.

TABLE 3

| Sliding member | Example | Comp. Example 1 | Comp. Example 2 |
|---|---|---|---|
| Friction coefficient | 0.24 | 0.74 | 1.02 |

Figure 4:
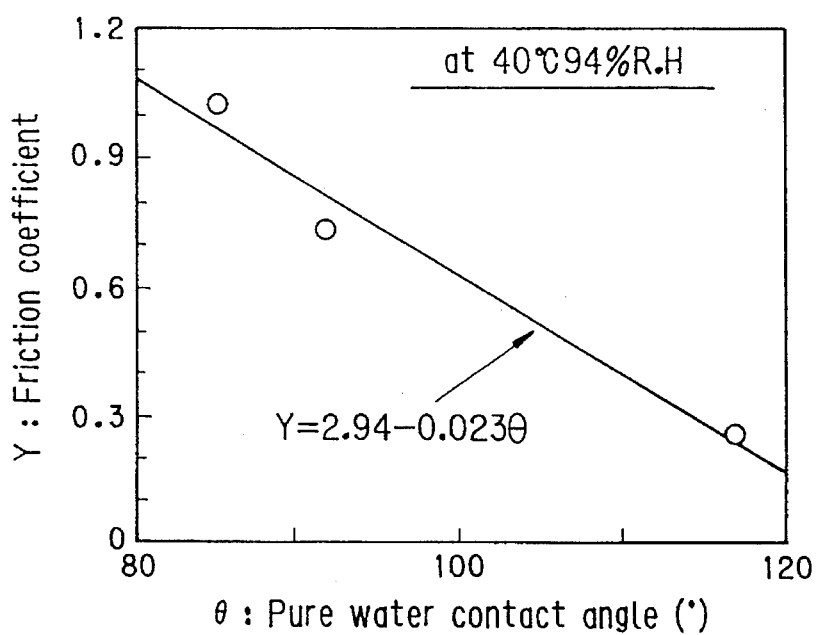
FIG. 4 is a characteristic chart showing the relationship between the pure water contact angle of a sliding member and the coefficient of friction.
Figure 5:
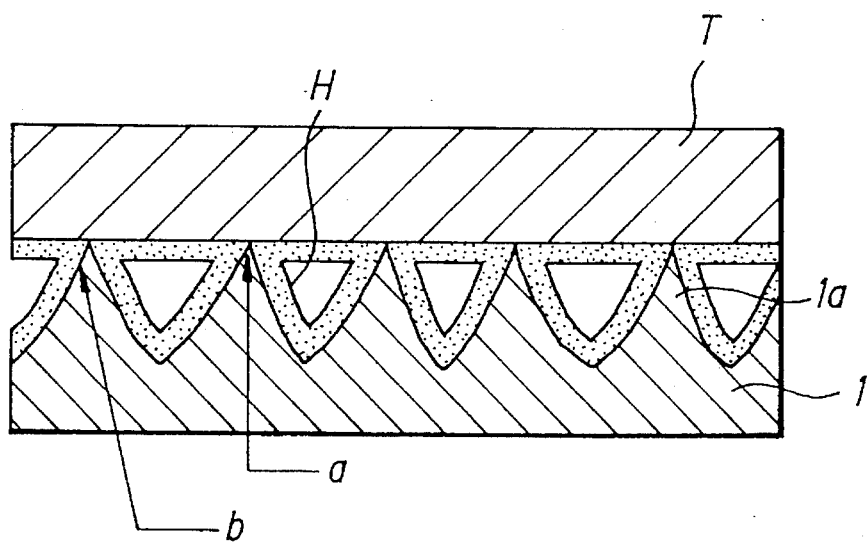
FIG. 5 is a sectional view showing the arrangement of a conventional sliding member, together with a video tape.
Figure 6:
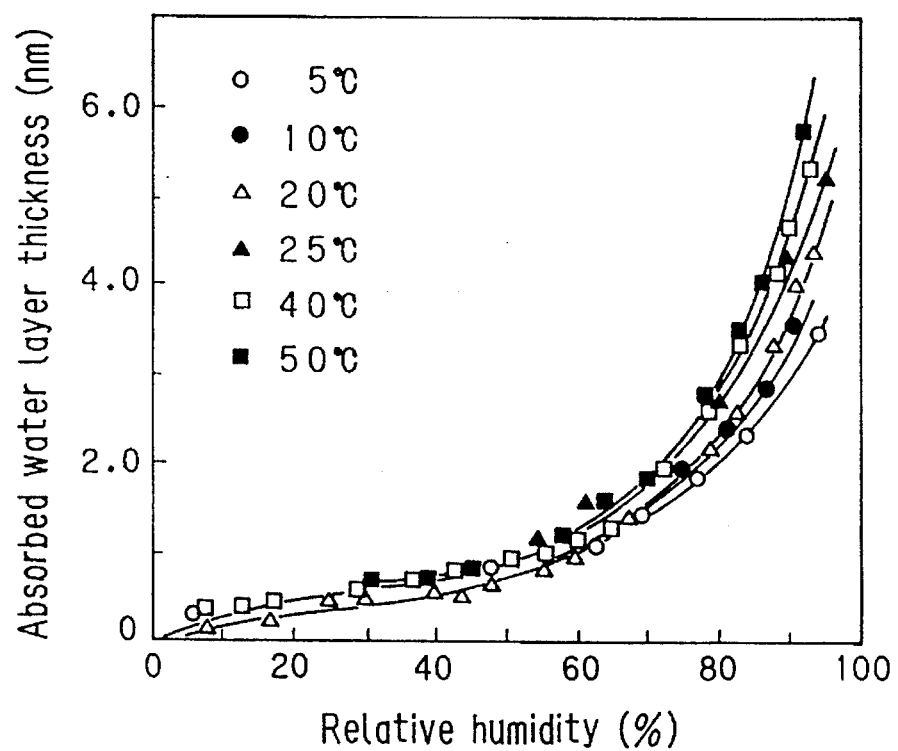
FIG. 6 is a characteristic chart showing the relationship between the layer thickness of water molecules (adsorbed water) physically adsorbed on a video tape on the one hand and the temperature and humidity on the other.
Figure 7:
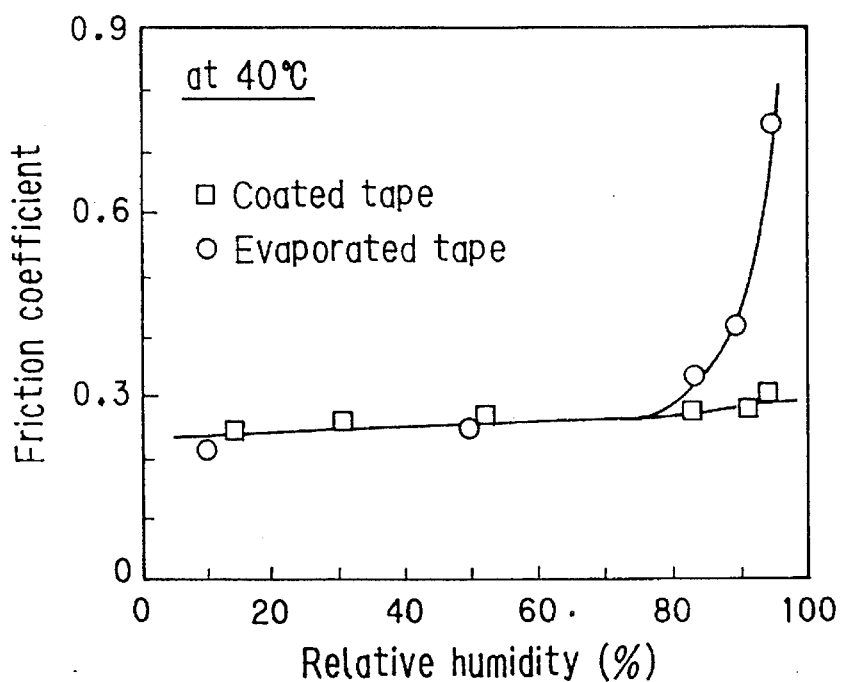
FIG. 7 is a characteristic chart showing the relationship between the coefficient of friction of an aluminum alloy sliding member with respect to each of commercially available coated and evaporated tapes and the relative humidity.
Figure 8:
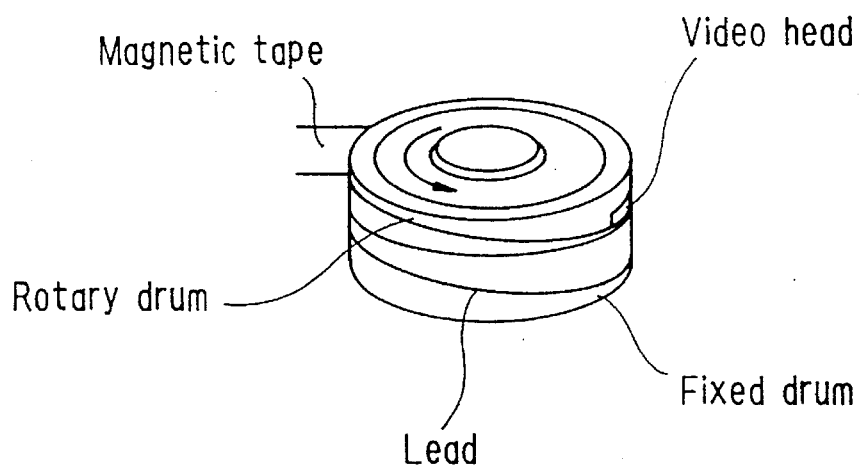
FIG. 8 shows one example of the arrangement of a drum part of a VTR.

FIG. 4 is a graph showing the change of the friction coefficient Y with the change of the pure water contact angle θ on the basis of the values shown in the above Table 3. As shown in FIG. 4, the characteristic curve is approximately linear. Thus, the degree of change of friction coefficient Y with the change of the pure water contact angle θ may be expressed by $Y = 2.94 - 0.023\theta$ Since the friction coefficient Y required in practical application is 0.7 or less, it will be understood from the above expression that the required pure water contact angle θ is at least 97°.

Thus, in the recording and reproducing apparatus according to the embodiment, the surface of the sliding member 1 on which the tape T slides is formed with a material of high water repellency so that the pure water contact angle θ is at least 97°. More specifically, the surface of the sliding member 1 is formed with the electrolessly plated nickel film 3 containing polytetrafluoroethylene particles 2. Therefore, it is possible to minimize the effect of adsorbed water H present at the interface between the tape T and the sliding member 1. Thus, the tape T can stably travel without sticking to the tape T even under conditions close to moisture condensational conditions. Consequently, damage to the tape T can be minimized.

Although in the foregoing embodiment the tape-shaped recording medium recording and reproducing apparatus of the present invention is applied to a VTR, it should be noted that the present invention may also be applied to other recording and reproducing apparatus, for example, audio tape recorders, DAT (Digital Audio Tape) recorders, etc.

What is claimed is:

1. A tape contact member for a recordable tape apparatus, comprising:

a tape contact surface on the tape contact member for sliding contact with a recordable tape, said tape contact surface being of nickel with polytetrafluoroethylene particles and having a pure water contact angle at said tape contact surface of at least 97°.

2. An apparatus for recording and reproducing a tape-shaped recording medium, which has a sliding member provided so that said tape-shaped recording medium slides in contact with said sliding member, wherein the pure water contact angle of a surface of said sliding member is at least 97°, and wherein the surface of said sliding member comprises an electrolessly plated nickel film containing polytetrafluoroethylene particles.

* * * * *